(12) United States Patent
Riddle

(10) Patent No.: US 11,325,435 B1
(45) Date of Patent: May 10, 2022

(54) BALE ACCUMULATOR OFFSET HITCH

(71) Applicant: Les Riddle, Gravette, AR (US)

(72) Inventor: Les Riddle, Gravette, AR (US)

(*) Notice: Subject to any disclaimer, the term of this patent is extended or adjusted under 35 U.S.C. 154(b) by 341 days.

(21) Appl. No.: 16/701,539

(22) Filed: Dec. 3, 2019

(51) Int. Cl.
| | |
|---|---|
| *A01D 85/00* | (2006.01) |
| *A01D 90/08* | (2006.01) |
| *B60D 1/44* | (2006.01) |
| *B60D 1/32* | (2006.01) |
| *B60D 1/173* | (2006.01) |
| *B60D 1/00* | (2006.01) |

(52) U.S. Cl.
CPC .............. *B60D 1/44* (2013.01); *A01D 85/005* (2013.01); *A01D 90/083* (2013.01); *B60D 1/173* (2013.01); *B60D 1/322* (2013.01); *A01D 2085/007* (2013.01); *B60D 2001/008* (2013.01)

(58) Field of Classification Search
CPC ............................ A01F 25/125; A01D 90/083
See application file for complete search history.

(56) References Cited

U.S. PATENT DOCUMENTS

| | | | | |
|---|---|---|---|---|
| 629,156 | A * | 7/1899 | Fentem | B60D 1/44 |
| | | | | 280/468 |
| 3,454,285 | A * | 7/1969 | Van Peursem | A01B 49/06 |
| | | | | 280/468 |
| 3,486,439 | A | 12/1969 | May et al. | 100/142 |
| 3,613,800 | A * | 10/1971 | Martin | A01B 63/023 |
| | | | | 172/445.2 |
| 3,706,273 | A | 12/1972 | Crawford | 100/189 |
| 3,922,007 | A * | 11/1975 | Friedebach | B60D 1/44 |
| | | | | 280/456.1 |
| 4,072,241 | A * | 2/1978 | Parker | A01D 90/083 |
| | | | | 294/107 |
| 4,153,132 | A * | 5/1979 | Biedebach | B62D 13/00 |
| | | | | 180/420 |
| 4,162,087 | A * | 7/1979 | Avrillon | B62D 49/02 |
| | | | | 280/460.1 |
| 4,310,275 | A * | 1/1982 | Hoelscher | A01D 85/005 |
| | | | | 414/111 |
| 4,710,086 | A | 12/1987 | Naaktgeboren et al. | 414/44 |
| 4,710,087 | A | 12/1987 | Naaktgeboren et al. | 414/44 |
| 4,955,774 | A | 9/1990 | VanEecke et al. | 414/111 |
| 4,961,679 | A | 10/1990 | VanEecke et al. | 414/111 |
| 5,192,177 | A * | 3/1993 | Cardinal | B60P 1/38 |
| | | | | 414/501 |
| 5,842,823 | A | 12/1998 | Kohnen et al. | 414/111 |
| 6,305,705 | B1 * | 10/2001 | Cook | B60D 1/44 |
| | | | | 280/455.1 |

(Continued)

FOREIGN PATENT DOCUMENTS

| | | | | |
|---|---|---|---|---|
| FR | 2464156 A1 * | 3/1981 | | A01D 90/083 |
| FR | 2592339 A1 * | 7/1987 | | B60D 1/44 |
| WO | WO-2004071161 A1 * | 8/2004 | | A01B 69/003 |

*Primary Examiner* — Minnah L Seoh
*Assistant Examiner* — Myles A Harris
(74) *Attorney, Agent, or Firm* — Keisling & Pieper PLC; David B. Pieper; Trent C. Keisling

(57) ABSTRACT

An offset hitch bale accumulator hitch for connecting a hay baler to a bale accumulator including a pitch axle based pitch movement assembly, a roll movement assembly using a long channel twisting joint, a yaw limiting movement assembly use double arm connections and an offset movement assembly including a beam in tube linear joint controlled by an extension actuator perpendicular the forward and backward towing forces.

12 Claims, 5 Drawing Sheets

(56) References Cited

U.S. PATENT DOCUMENTS

| | | | | |
|---|---|---|---|---|
| 7,559,569 B2* | 7/2009 | Nejsum | ............... | B62D 13/025 |
| | | | | 280/459 |
| 8,091,913 B1* | 1/2012 | White | ...................... | B60D 1/44 |
| | | | | 280/468 |
| 10,308,086 B2* | 6/2019 | Tiainen | ................... | B60D 1/246 |
| 2003/0132605 A1* | 7/2003 | Wiers | ....................... | B60D 1/46 |
| | | | | 280/468 |
| 2005/0241560 A1* | 11/2005 | Gencarelli | .............. | B63B 21/56 |
| | | | | 114/249 |
| 2014/0151978 A1* | 6/2014 | Whitney, Jr. | .......... | B60D 1/173 |
| | | | | 280/458 |

\* cited by examiner

BALE ACCUMULATOR OFFSET HITCH

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in bale accumulators and how they are hitched to hay bale machinery. More particularly, the invention relates to improvements particularly suited for providing a center pull behind a baler for travel with an offset pull for bale accumulation. In particular, the present invention relates specifically to a bale accumulator offset hitch.

2. Description of the Known Art

As will be appreciated by those skilled in the art hay balers and accumulators are known in various forms. Patents disclosing information relevant to these items include: U.S. Pat. No. 4,310,275, issued to Hoelscher on Jan. 12, 1982 entitled Tilting platform hay bale accumulator; U.S. Pat. No. 4,710,086, issued to Naaktgeboren, et al. on Dec. 1, 1987 entitled Bale accumulator; U.S. Pat. No. 4,710,087, issued to Naaktgeboren, et al. on Dec. 1, 1987 entitled Bale accumulator and discharger; U.S. Pat. No. 4,955,774, issued to Van Eecke, et al. on Sep. 11, 1990 entitled Modular bale accumulator; U.S. Pat. No. 4,961,679, issued to Van Eecke, et al. on Oct. 9, 1990 entitled Agricultural bale accumulator with bale turning mechanism; U.S. Pat. No. 5,192,177, issued to Cardinal on Mar. 9, 1993 entitled Mobile harvester for hay bales; U.S. Pat. No. 5,842,823 issued to Kohnen, et al. on Dec. 1, 1998 entitled Bale-accumulating trailer; U.S. Pat. No. 3,486,439, issued to May et al. on Dec. 30, 1969 entitled Agricultural apparatus; and U.S. Pat. No. 3,706,273, issued to Crawford on Dec. 19, 1972 entitled Feed mechanism for hay balers. Each of these patents is hereby expressly incorporated by reference in their entirety.

FIG. 1 is a top view of a prior art tractor 10 using a point hitch 12 for using forward and backwards towing forces for pulling and pushing a side discharge hay baler 20 with a rotary pickup finger front 22 and side discharge chute 24 positioned for a side input accumulator 30. and FIG. 2 shows the tow angled problem with pulling a center discharge chute 26 hay baler 20 with the same side input accumulator 30 hitched to the side of the hay baler 20. Note the angled relationship shown by the boards on the deck 202 on the accumulator trailer 30. This angled pull relationship is hard on the tractor 10, the hay baler 20 axle 28, and results in problems during natural field variations when the accumulator 30 doesn't pull evenly.

From these prior references it may be seen that these prior art patents are very limited in their teaching and utilization, and an improved bale accumulator offset hitch is needed to overcome these limitations.

SUMMARY OF THE INVENTION

The present invention is directed to an improved bale accumulator offset hitch for connecting a center discharge hay baler with a side input bale accumulator for both in line transport and offset bale accumulation. In accordance with one exemplary embodiment of the present invention, an offset hitch bale accumulator is provided with an accumulator trailer connected with an offset hitch. The offset hitch uses a pitch movement assembly, roll movement assembly, yaw limiting movement assembly, and offset movement assembly to provide proper positioning of the bale accumulator across undulating surfaces such as fields and roads.

The pitch movement assembly allows for pitch movement using an axle and plate assembly. The roll movement assembly uses long channel bodies with wing extensions connected to center sections pivotally connected together. The long wings extend to the edges of the deck and maintain the yaw position of the bale accumulator while the center pivot still allows roll movement of the baler. The yaw movement of the front long channel body is controlled by two yaw arms connected to the axle of the baler. Finally, an offset movement assembly uses a square beam slidably mounted in a square tube and positionally extended using an extension actuator to move the position of the trailer deck in relation to the baler.

One object of the present invention is to allow a side input bale accumulator to be usable with both a center output and side output baler.

Another object of the present invention is to allow the selective movement of a bale accumulator between an offset accumulating position and an aligned transport position.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
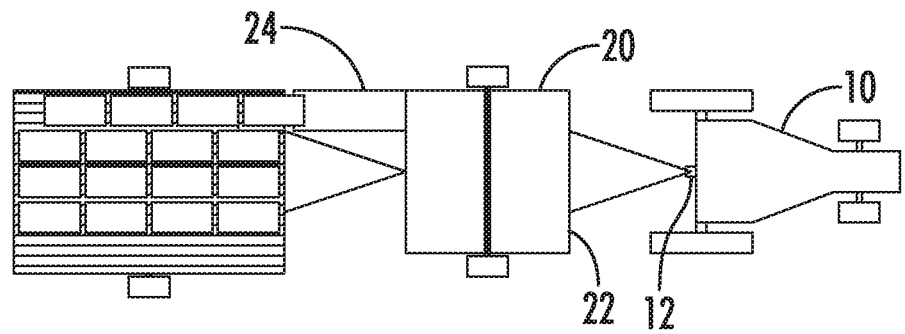
FIG. 1 is a top view of a prior art tractor pulling a side discharge hay baler and a side input accumulator.
Figure 2:
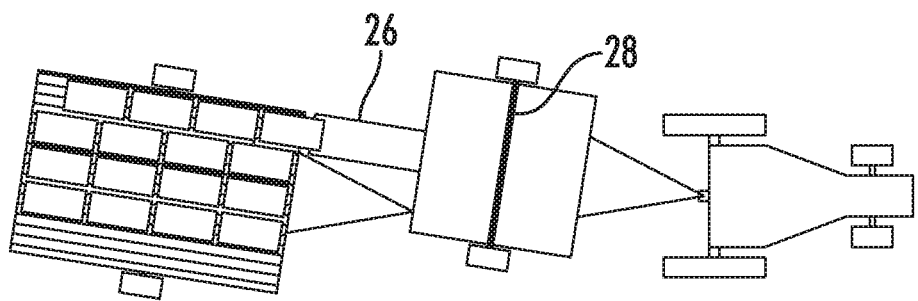
FIG. 2 is a top view of a prior art tractor pulling a center discharge hay baler and a side input accumulator.
Figure 3:
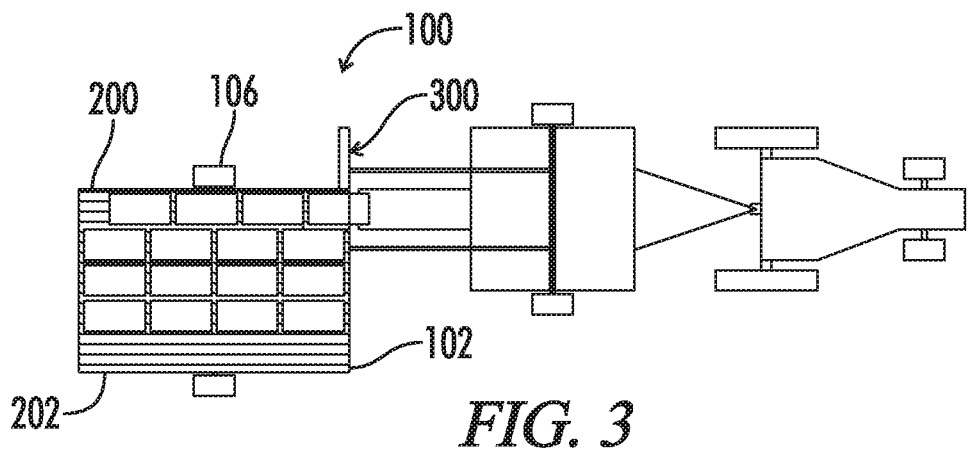
FIG. 3 is a top view of a bale accumulator offset hitch allowing a tractor to pull a center discharge hay baler and a side input accumulator in an operating position.
Figure 4:
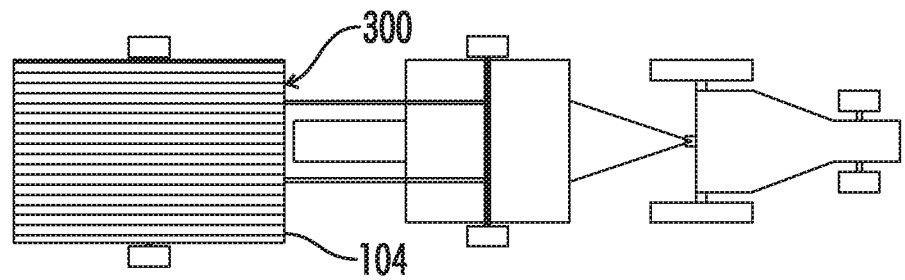
FIG. 4 is a top view of a bale accumulator offset hitch allowing a tractor to pull a center discharge hay baler and a side input accumulator in a transport position.
Figure 5:
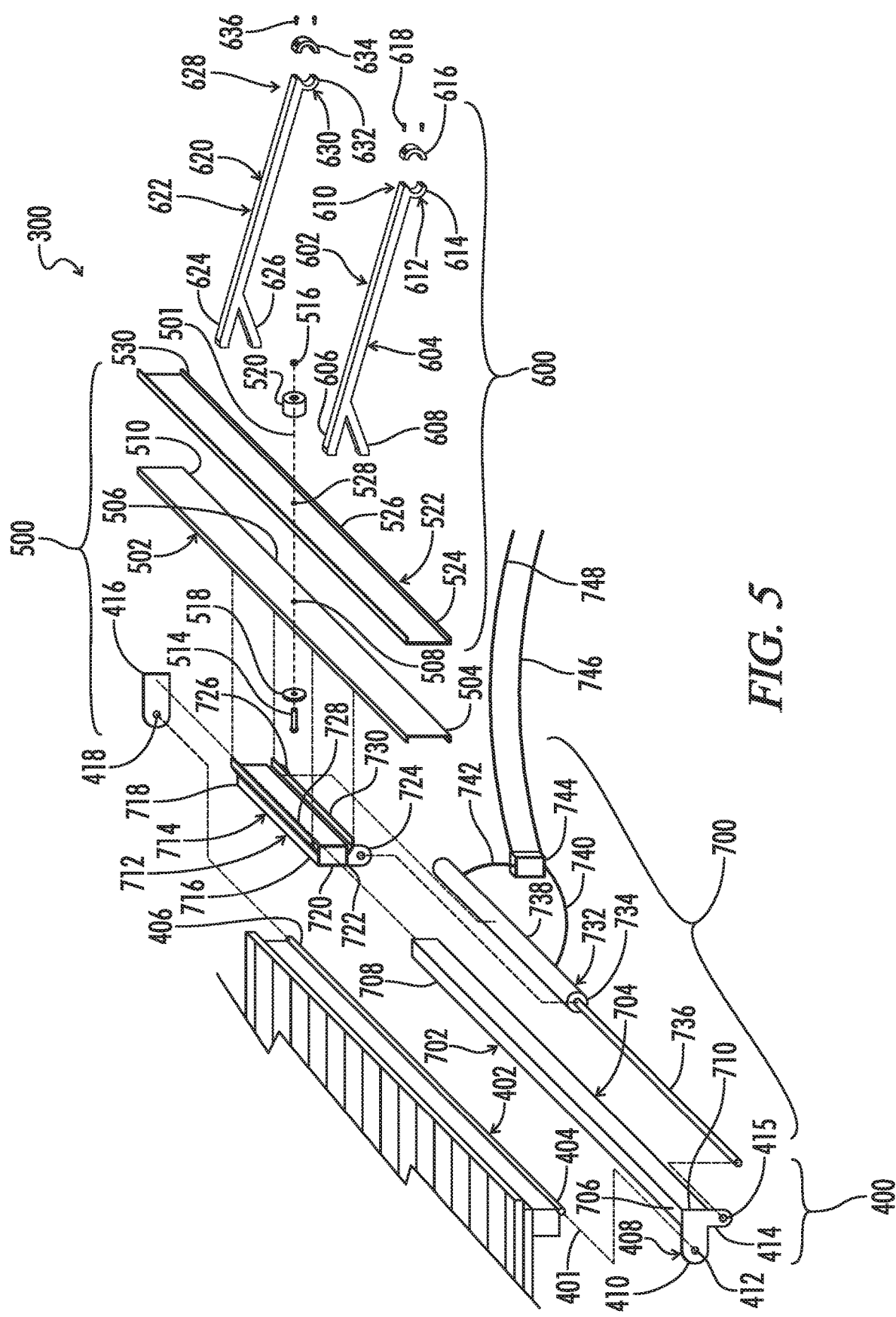
FIG. 5 is an exploded perspective view of a bale accumulator offset hitch.
Figure 7:
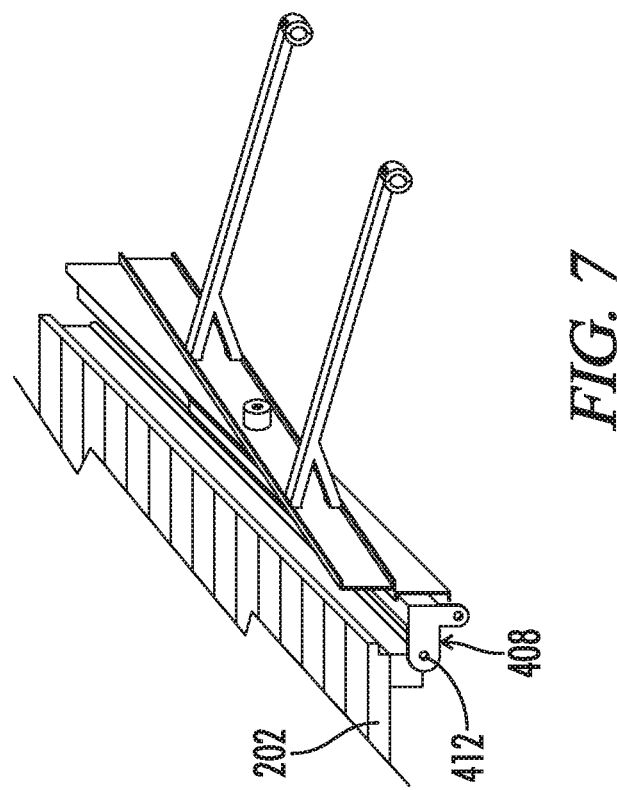
FIG. 7 is a perspective view of a bale accumulator offset hitch in a second pitch position.
Figure 6:
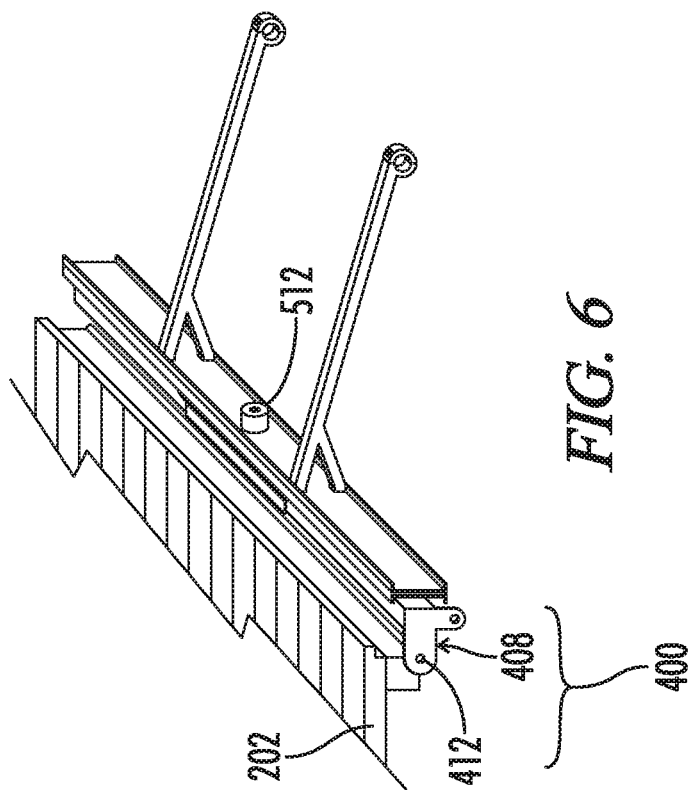
FIG. 6 is a perspective view of a bale accumulator offset hitch in a first pitch position.
Figure 9:
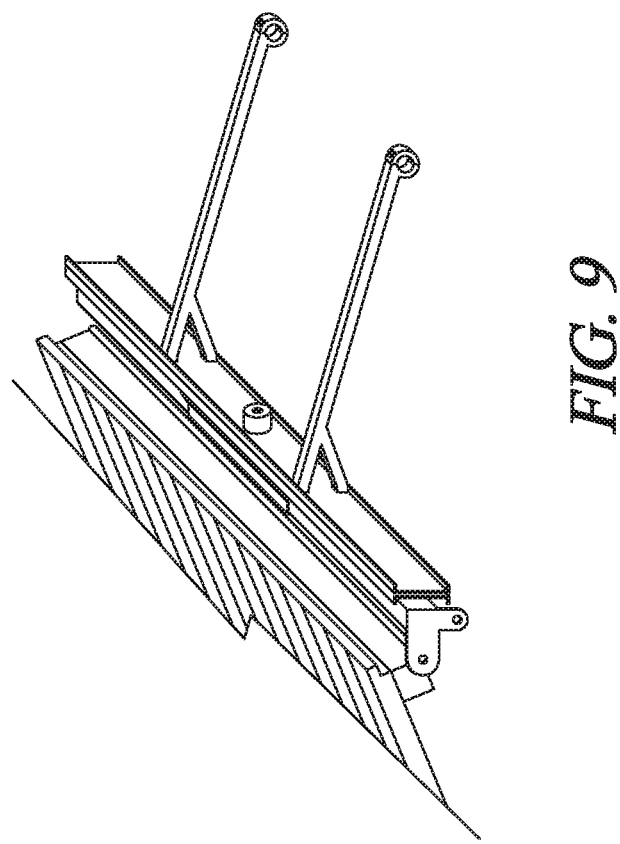
FIG. 9 is a perspective view of a bale accumulator offset hitch in a second roll position.
Figure 8:
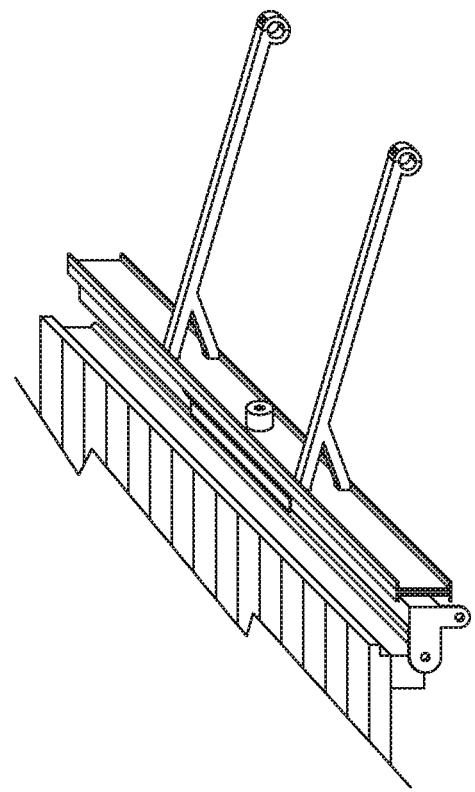
FIG. 8 is a perspective view of a bale accumulator offset hitch in a first roll position.
Figure 11:
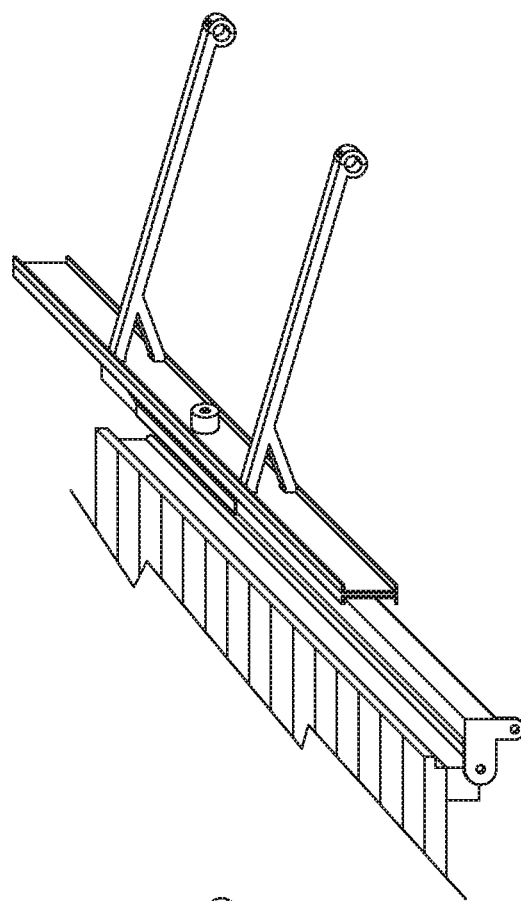
FIG. 11 is a perspective view of a bale accumulator offset hitch in an extended offset position.
Figure 10:
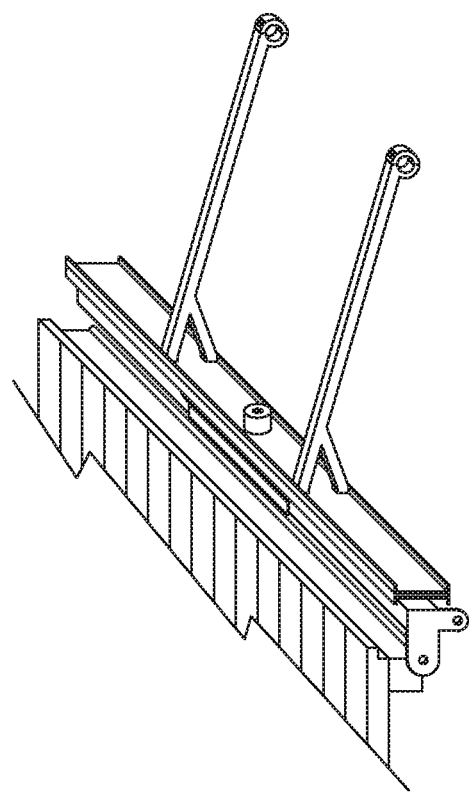
FIG. 10 is a perspective view of a bale accumulator offset hitch in a retracted offset position.

As shown in FIGS. 3 through 11 of the drawings, one exemplary embodiment of the present invention is generally shown as an offset hitch bale accumulator 100. The offset hitch bale accumulator 100 is connected to the front of an accumulator trailer 200 and uses an offset hitch 300 and swiveling tires 106. The offset hitch allows selective positioning of the accumulator trailer 200 between an offset pull position 102 and a centered pull position 104 and the swiveling tires 106 allow the baler and accumulator to act as a single trailer. The offset hitch 300 includes a pitch movement assembly 400, a roll movement assembly 500, a yaw limiting movement assembly 600, and an offset movement assembly 700.

The pitch movement assembly 400 uses a pitch axle 402 welded to the front of the accumulator trailer 200 below the deck 202 to define a pitch rotation axis 401. The pitch axle includes a first axle end 404 and a second axle end 406. The first axle end 404 mounts into the first end axle aperture 412 on the pitch arm 410 of the first pitch plate 408. The first pitch plate 408 also includes an extension arm 414 with a ram connection aperture 415. The second axle end 406 mounts into the second end aperture 418 in the second Pitch plate 416.

The roll movement assembly 500 pivots around a roll rotation axis 501 using a back channel body 502 pivotally mounted by a roll pivot 512 to a front channel body 522. The length of the back channel body 502 and front channel body 522 and the extension of the wings 504, 510, 524, 530 to the edges of the deck 202 provide a long bearing surface to resist the yaw forces at the roll pivot 512. The back wings 504, 510 can slide up and down independently of the front wings 524, 530 so that they transfer forces but don't inhibit roll movement. The back channel body 502 includes a back left wing extension 504, back central section 506 with back pivot aperture 508, and a back right wing extension 510. The front channel body 522 includes a front left wing extension 524, front central section 526 with front pivot aperture 528, and a front right wing extension 530. The roll pivot 512 includes a back roll axle housing 518 mounted to the back of the back central section 506 and a front roll axle housing 520 mounted to the front of the front central section 526. A first axle body 514 is pivotally mounted to the back roll axle housing 518 and then passes through the back pivot aperture 508 and the front pivot aperture 528 where it is pivotally secured in the front roll axle housing 520 by an axle nut 516. Grease is spread as a lubricant between the back channel body 502 and the front channel body 522 to allow ease of movement at the roll pivot 512 while still allowing the force transfer to resist movement in the yaw direction.

The yaw limiting movement assembly 600 uses a left yaw arm 602 and right yaw arm 620 attached to the baler axle 28 to limit yaw movement between the baler 20 and the offset accumulator 100. The left yaw arm 602 includes a left arm body 604 with a left plate connection end 606 and left arm brace 608 securing the left yaw arm to the front channel body 522. Distal from the left plate connection end 606 is the left axle connection end 610 that includes the left clamp body 612 formed from a left back body 614 and left front body 616 secured by left body bolts 618 with an internal shape to mount around the housing of the baler axle 28. Similarly, the right yaw arm 620 includes a right arm body 622 with a right plate connection end 624 and right arm brace 626 securing the right axle connection end 628 to the front channel body 522. Distal from the right plate connection end 624 is the right clamp body 630 that includes the right back body 632 secured by right body bolts 636 to the right front body 634 with an internal shape to mount around the housing of the baler axle 28.

The offset movement assembly 700 allows the accumulator deck 202 to be offset in relation to the yaw limiting movement assembly 600 that is fixed to the baler 20 at the baler axle 28. The offset movement assembly 700 includes an offset movement beam 702 that slides in a base position tube 712 through the force of an extension actuator 732 that is tied into the raising and lowering hydraulic loop of the rotary pickup finger front 22 of the baler 20. Note that when using this system, the extension actuator is not under a critical load for either the offset or for the center pull position and is only necessary when moving between the positions. This provides a robust system in real world conditions. When used with a center discharge baler 20, the hydraulic flow for lowering of the rotary pickup finger front 22 actuates the elongation of the extension actuator 732 and the flow for raising of the rotary pickup finger front 22 actuates the shortening of the extension actuator 732. The offset movement beam 702 includes a beam body 704 with a first beam end 706 and a second beam end 708 with a beam profile 710 matching the tube profile 720 of the base position tube 712. Note that in this preferred embodiment, the beam profile is a non-rotating rectangular profile matching the base position tube's non-rotating rectangular profile. The base position tube 712 includes a tube body 714 with a first tube end 716, second tube end 718, and tube profile 720 forming a beam aperture 722 for controlling the movement forces on the beam while still providing a sliding movement of the beam 702. The extension actuator 732 is connected via the ram barrel 738 to the base position tube 712 via a first ram connection plate 724 and second ram connection plate 726. The base position tube 712 is connected via a weld to the back channel body 502 by the upper channel connection arm 728 and lower channel connection arm 730.

The extension actuator 732 in the preferred embodiment is a hydraulic ram 734 with a ram rod 736 extending from a ram barrel 738. The ram rod 736 is connected to the extension arm 414 using the ram connection aperture 415. The hydraulic connections to the tractor are made with a first ram pipe 740 and second ram pipe 742 through a hydraulic bypass 744 for flow though systems to a first hydraulic line 746 and second hydraulic line 748.

Reference numerals used throughout the detailed description and the drawings correspond to the following elements:

Tractor 10
  Basic hitch 12
Hay baler 20
  Rotary pickup finger front 22
  Side Discharge chute 24
  Centered discharge chute 26
  Baler axle 28
Offset hitch bale accumulator 100
  offset pull position 102
  centered pull position 104
  swiveling tires 106
Accumulator trailer 200
  Deck 202
Offset hitch 300
Pitch movement assembly 400
  Pitch rotation axis 401
  Pitch axle 402
    First axle end 404
    Second axle end 406
  First pitch plate 408
    Pitch arm 410
      First end axle aperture 412
      Extension arm 414
        Ram connection aperture 415
    Second Pitch plate 416
      Second end axle aperture 418
Roll movement assembly 500
  Roll rotation axis 501
  Back channel body 502
    Back left wing extension 504
    Back Central section 506
      Back Pivot aperture 508
    Back Right wing extension 510
  Roll pivot 512
    First axle body 514
    Axle nut 516
    Back roll axle housing 518
    Front roll axle housing 520
  Front channel body 522
    Front left wing extension 524
    Front central section 526
      Front pivot aperture 528
    Front right wing extension 530
Yaw limiting movement assembly 600
  Left yaw arm 602
    Left arm body 604
      Left plate connection end 606
      Left arm brace 608
      Left axle connection end 610
        Left clamp body 612
          Left back body 614
          Left front body 616
          Left body bolts 618
  Right yaw arm 620
    Right arm body 622
      Right plate connection end 624
      Right arm brace 626
      Right axle connection end 628
        Right clamp body 630
          Right back body 632
          Right front body 634
          Right body bolts 636
Offset movement assembly 700
  Offset movement beam 702
    Beam body 704
    First beam end 706
    Second beam end 708
    Beam profile 710
  Base position tube 712
    Tube body 714
    First tube end 716
    Second tube end 718
    Tube profile 720
    Beam aperture 722
    First ram connection plate 724

-continued

Second ram connection plate 726
Upper channel connection arm 728
Lower channel connection arm 730
Extension actuator 732
  Hydraulic ram 734
  Ram rod 736
  Ram barrel 738
  First ram pipe 740
  Second ram pipe 742
  Hydraulic bypass 744
  First hydraulic line 746
  Second hydraulic line 748

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. An offset hitch bale accumulator hitch apparatus for connection to a hay baler with a baler axle, the offset hitch bale accumulator hitch apparatus comprising:

a pitch movement assembly including a pitch axle rotatably mounted in a first pitch plate and second pitch plate;

a roll movement assembly using an elongated back channel body pivotally mounted parallel to an elongated front channel body;

a yaw limiting movement assembly including a left yaw arm and right yaw arm mounted to the elongated front channel body; and an offset movement assembly including an offset movement beam slideably mounted in a base position tube with an extension actuator connected between the offset movement beam and the base position tube to control movement.

2. The offset hitch bale accumulator hitch apparatus of claim 1, further comprising:
- the pitch movement assembly including a pitch axle with a first axle end and a second axle end;
- a first pitch plate including a first end axle aperture;
- a second pitch plate including a second end axle aperture;
- the first axle end rotatably mounted in the first end axle aperture and the second axle end rotatably mounted in the second end axle aperture.

3. The offset hitch bale accumulator hitch apparatus of claim 1, further comprising:
- the elongated back channel body including a back left wing extension, a back central section and a back right wing extension;
- the elongated front channel body including a front left wing extension, a front central section and a front right wing extension.

4. The offset hitch bale accumulator hitch apparatus of claim 1, further comprising:
- a roll pivot for pivotally mounting the elongated back channel body to the elongated front channel body;
- the roll pivot including a first axle body pivotally secured with an axle nut in a back roll axle housing and front roll axle housing.

5. The offset hitch bale accumulator hitch apparatus of claim 1, further comprising:
- the yaw limiting movement assembly including a left yaw arm and a right yaw arm;
- each yaw arm including a plate connection end and arm brace for connection to the elongated front channel body.

6. The offset hitch bale accumulator hitch apparatus of claim 1, further comprising:
- the yaw limiting movement assembly including a left yaw arm and a right yaw arm;
- each yaw arm including an axle connection end for connection to the baler axle.

7. The offset hitch bale accumulator hitch apparatus of claim 1, further comprising:
- each axle connection end including a back body and a front body connected by body bolts.

8. The offset hitch bale accumulator hitch apparatus of claim 1, further comprising:
- the offset movement assembly including a beam body with a first beam end and a second beam end and defining a non rotating beam profile;
- the base position tube including a tube body with non rotating tube profile defining a beam aperture allowing sliding of the beam body without rotation in relation to the tube body.

9. The offset hitch bale accumulator hitch apparatus of claim 1, further comprising:
- a first ram connection plate and second ram collection plate connecting the base position tube to the extension actuator.

10. The offset hitch bale accumulator hitch apparatus of claim 1, further comprising:
- an upper channel connection arm and a lower channel connection arm connecting the base position tube to the elongated front channel body.

11. The offset hitch bale accumulator hitch apparatus of claim 1, further comprising:
- the extension actuator including a hydraulic ram.

12. The offset hitch bale accumulator hitch apparatus of claim 1, further comprising:
- the extension actuator including a hydraulic ram and a hydraulic bypass.

* * * * *